Dec. 29, 1931. M. W. ARROWOOD 1,838,521
APPARATUS FOR AND METHOD OF FEEDING POWDERED FUEL
Filed March 17, 1928
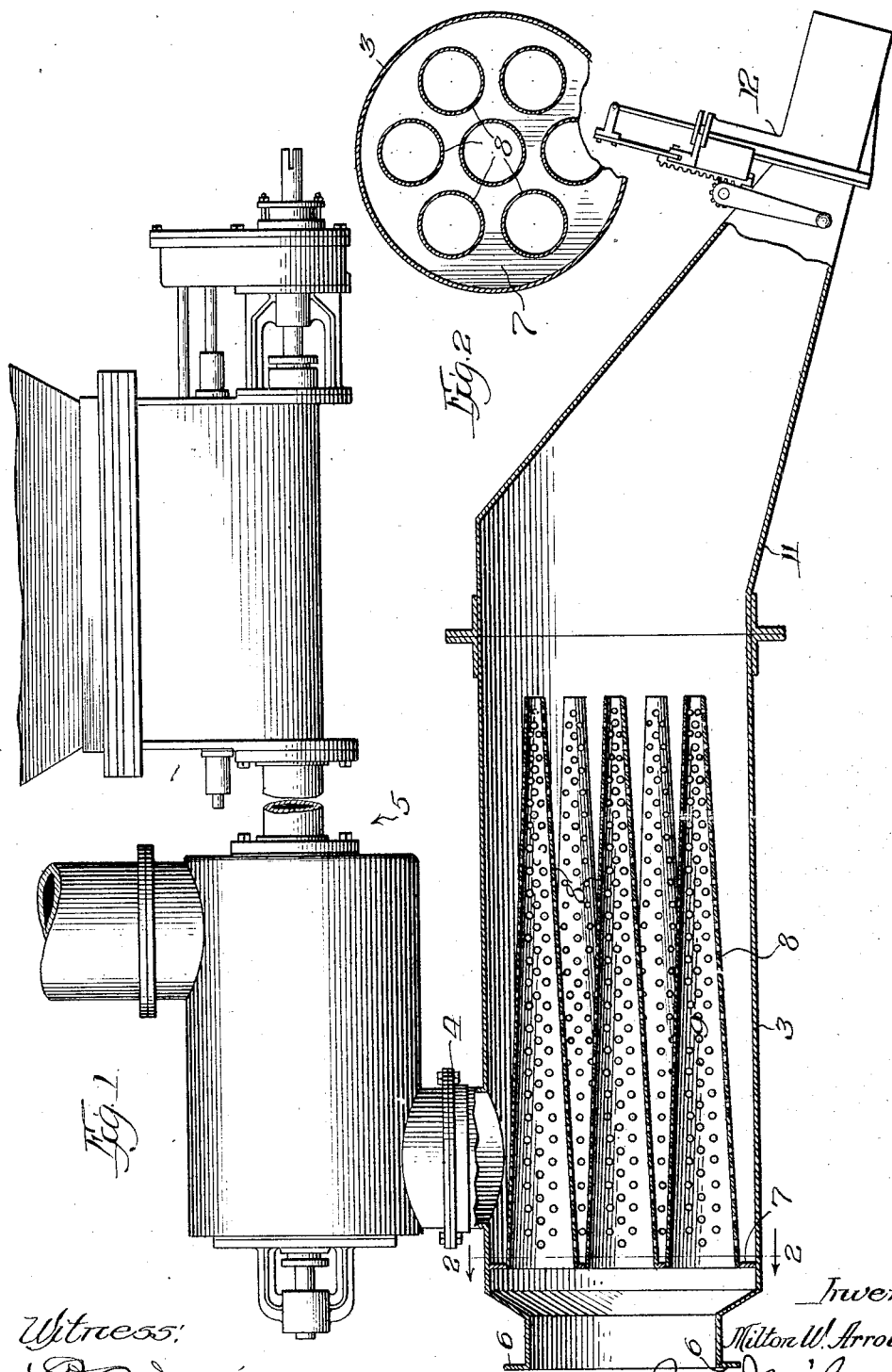

Patented Dec. 29, 1931

1,838,521

UNITED STATES PATENT OFFICE

MILTON W. ARROWOOD, OF NEW YORK, N. Y.

APPARATUS FOR AND METHOD OF FEEDING POWDERED FUEL

Application filed March 17, 1928. Serial No. 262,481.

This invention relates to apparatus for and method of feeding powdered fuel, and more particularly to such an apparatus and method for thoroughly mixing the requisite amount of air with the fuel to support complete combustion.

I am aware that prior to my invention various apparatuses have been employed for mixing air and powdered fuel with a view to admixing with the fuel the requisite amount of air to support complete combustion. These apparatuses have had varying degrees of success depending upon the character and degree of turbulence set up in the mixture prior to the delivery thereof to the furnace and also upon the proportion of air mixed with a given amount of fuel. In this connection it is highly important to mix with a given amount of fuel the proper proportion of air necessary to support complete combustion and also to set up in the mixture prior to its delivery to the furnace a turbulence of such character as not to cause the mixture or any combustible gases formed therefrom to escape up the stack. It is important also, that the degree of such turbulence be such as to sustain the powdered fuel until complete combustion takes place.

It is accordingly the primary object of this invention to provide an apparatus whereby a sufficient turbulence is effected in the mixture of air and powdered fuel to sustain the fuel until delivery to the furnace and combustion of the mixture and the character of such turbulence is such as to permit the combustion of the mixture to take place in a minimum of furnace space and without danger of the velocities in the mixture causing any portion of it or of the combustible gases formed therefrom to escape up the stack.

It is also an object of this invention to provide an apparatus of the character described in which the proper proportion of air may be conveniently mixed with the powdered fuel to support a high degree of combustion.

It is further an object of this invention to provide an apparatus of the character described which is simple and economical in operation and manufacture.

Other and further objects of this invention will be apparent as the same becomes better understood from an examination of the specification and claims in connection with the accompanying drawings wherein;

Fig. 1 is a vertical view, partly in section of an apparatus embodying my invention.

Fig. 2 is a fragmentary sectional view taken at the line 2—2 in Fig. 1.

Referring to drawings more particularly, numeral 3 represents a cylindrical shell of a mixer which forms an outer conduit, near one end of which, is provided a flanged connection 4, whereby the shell is connected with a suitable feeder 5, for example, such as is shown in connection with my copending application for United States Letters Patent for apparatus for feeding powdered fuel, Serial No. 624,927 filed March 14, 1923, or such as is shown in connection with Patent No. 1,355,444 of October 12, 1920. This feeder is capable of delivering powdered fuel to the shell 3 with the fuel preliminary mixed with air although it is understood that the feeder may be used to supply powdered fuel without preliminary mixing with air. The air that is preliminarily mixed with the fuel in the feeder is not sufficient to support complete combustion but merely carries the fuel into the mixer 8, where it is mixed with the requisite amount of additional air to support complete combustion. The left, or inlet end of the shell 3, is provided with a flange connection 6 whereby the shell may be connected to a source (not shown) of air under pressure. A header 7, in the form of an apertured plate having a series of laterally displaced apertures therein is mounted across the interior of the shell 3 in proximity to the inlet thereof. A plurality of tubular members 8 are supported in the apertures of the header 7 in axially spaced relation and extend longitudinally of the shell 3 with their axes parallel with each other and the axis of said shell.

The tubular members 8, act to split the path of the secondary air into a plurality of laterally spaced substantially parallel paths and are each provided with perforations 9 whereby the air is caused to flow in a plurality of radial directions from these paths to commingle with the surrounding mixture of air and fuel which has come in through the connection 4 from the feeder. In order that the pressure of the air in the tubular members 8 and consequently the pressure of the streams of jets emanating therefrom may be reduced as little as possible throughout the length thereof, these tubes are preferably tapered or conical in shape throughout their lengths.

The air flowing out radially of the various tubes 8 through their respective perforations 9, impinges against and enters into the surrounding mixture of air in the fuel and sets up considerable turbulence in the surrounding mixture of air and fuel. This causes the individual particles of fuel to be uniformly distributed throughout the interior of the shell 3, and supported by sufficient air to effect complete combustion when the mixture is delivered to the furnace.

The right, or outlet end of the conduit 3, is connected to a delivery conduit 11 whereby the mixture is delivered to the furnace or fuel box with which the apparatus is connected. The inclined wall of the conduit 11 deflects the current downwardly. This conduit is flared outwardly transversely at its delivery end so that it spreads the currents while it changes their direction thus further increasing the turbulence. For the purpose of closing off the burner to protect the same from the radiant heat of the combustion chamber whenever necessary, a suitable control gate and nozzle 12 are provided at the point of delivery of said conduit 11 to said furnace. The control gate and nozzle 12 may be of any suitable type, but in this illustration are the same as that disclosed in connection with my aforementioned copending application.

It will be noted that the supplementary air for combustion is introduced and mixed into the stream of fuel and air from within the stream of fuel outwardly into the surrounding fuel to commingle with and disperse the fuel. The supplemental air is also delivered to the stream of fuel in a direction inclined to the direction of travel of the fuel. Therefore the turbulent effect of the entering stream of air into the stream of fuel is much greater than the effect upon the linear velocity. For this latter reason the addition of supplemental air does not have a great tendency to transport the resulting mixture far from the outlet of the nozzle and accordingly it will not cause unburnt gases to be expelled from the stack.

The operation and advantages of my aforedescribed apparatus will be apparent without further description.

I am aware that many details may be varied and many changes made without departing from the principles of this invention and I therefore do not wish to be limited to the details shown or described.

I claim:

1. In an apparatus of the character described, a tubular mixing conduit, an apertured header disposed across said conduit adjacent one end thereof, means for delivering air under pressure to said header, a plurality of tubular members secured to said header in communication with said apertures and with their axes laterally spaced, said members being tapered throughout substantially their entire lengths from their intake to their opposite ends and means for delivering powdered fuel through the conduit over the exterior of said members, said members being provided with orifices to permit the air to be projected outwardly in a plurality of streams of substantially equal pressures into the surrounding fuel to commingle therewith.

2. The process of feeding powdered fuel with the requisite amount of air to support complete combustion to a furnace which consists in delivering the powdered fuel in a stream directed toward the furnace, conducting a plurality of streams of air into the interior of the fuel stream, expanding the streams of air outwardly into the surrounding fuel in relatively smaller streams of substantially equal pressures and directed at an angle to the flow of fuel and conducting the mixture to the furnace.

3. In an apparatus for delivering powdered fuel, an elongated hollow mixing shell, a connection to said shell for delivering powdered fuel thereto, means for delivering a plurality of streams of air under pressure into the interior of said shell, means for maintaining the streams of air in spaced relation with their axes parallel to each other and to the longitudinal axis of said shell and for directing air from said streams outwardly into the surrounding fuel in a plurality of relatively smaller air streams at substantially equal pressures.

4. In an apparatus for feeding powdered fuel, a mixing shell, an apertured tube sheet arranged across said shell adjacent one end thereof, a plurality of tapered tubular members secured at their larger ends to said tube sheet in communication with said apertures and disposed with their axes laterally spaced and parallel, means for delivering air under pressure to said tube sheet and to said tapered members, and means for delivering powdered fuel into the shell over the exterior of said tapered members, said tapered members being provided with apertures to permit the air to flow outwardly in a plurality of streams at substantially equal pressures into the surrounding fuel to commingle therewith.

In witness of the foregoing I affix my signature.

MILTON W. ARROWOOD.